(12) United States Patent
Ojeil et al.

(10) Patent No.: US 7,577,675 B2
(45) Date of Patent: Aug. 18, 2009

(54) DETERMINING A MAPPING OF AN OBJECT TO STORAGE LAYER COMPONENTS

(75) Inventors: Waleed Ojeil, San Francisco, CA (US); Sumanta Chatterjee, Fremont, CA (US); Juan Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 541 days.

(21) Appl. No.: 10/427,321

(22) Filed: Apr. 30, 2003

(65) Prior Publication Data

US 2004/0220960 A1 Nov. 4, 2004

(51) Int. Cl.
G06F 7/00 (2006.01)
G06F 17/00 (2006.01)

(52) U.S. Cl. .............................. 707/102; 707/3; 707/10; 707/104.1; 707/204; 707/205

(58) Field of Classification Search ...................... 707/1, 707/205, 102
See application file for complete search history.

(56) References Cited

U.S. PATENT DOCUMENTS

| | | | | |
|---|---|---|---|---|
| 5,664,177 A | * | 9/1997 | Lowry | 707/100 |
| 5,678,042 A | * | 10/1997 | Pisello et al. | 714/47 |
| 5,909,698 A | * | 6/1999 | Arimilli et al. | 711/145 |
| 6,047,294 A | * | 4/2000 | Deshayes et al. | 707/204 |
| 6,175,837 B1 | * | 1/2001 | Sharma et al. | 707/103 Y |
| 6,282,602 B1 | * | 8/2001 | Blumenau et al. | 711/4 |
| 6,356,890 B1 | * | 3/2002 | Agrawal et al. | 707/2 |
| 6,564,219 B1 | * | 5/2003 | Lee et al. | 707/100 |
| 6,912,548 B1 | * | 6/2005 | Black | 707/200 |
| 6,938,059 B2 | * | 8/2005 | Tamer et al. | 707/205 |
| 6,993,530 B2 | * | 1/2006 | Lee et al. | 707/100 |
| 7,111,147 B1 | * | 9/2006 | Strange et al. | 711/209 |
| 7,124,247 B2 | * | 10/2006 | Korgaonkar | 711/114 |
| 2002/0019909 A1 | * | 2/2002 | D'Errico | 711/114 |
| 2003/0208463 A1 | * | 11/2003 | Vishlitzky et al. | 707/1 |

OTHER PUBLICATIONS

Oracle Corporation, "Oracle 9i, Database Administrator's Guide," Release 2 (9.2), Mar. 2002, Part No. A96521-01, Chapters 3 and 21, 65 pages.

* cited by examiner

Primary Examiner—Hosain T Alam
Assistant Examiner—Usmaan Saeed
(74) Attorney, Agent, or Firm—Hickman Palermo Truong & Becker LLP; Christian A. Nicholes (57) ABSTRACT

A method and apparatus for determining a mapping of a database object to storage layers is provided. According to one aspect, a database server generates views that represent which components of each storage layer store parts of the object. The views are based on information that the database server automatically gathers from one or more vendor libraries. Each library implements a common API. Each storage layer is associated with a library. The database server passes the object's identifier to each library's implementation of a get-mapping routine of the API. A process that is associated with the storage layer that recognizes the object's identifier responds with the identity of one or more components of the storage layer that store one or more parts of the object. The database server recursively uses this information to obtain mappings between storage layer components and underlying storage layer components.

30 Claims, 4 Drawing Sheets

DETERMINING A MAPPING OF AN OBJECT TO STORAGE LAYER COMPONENTS

FIELD OF THE INVENTION

The present invention relates to data storage, and in particular, to determining a mapping of a database object to storage layer components.

BACKGROUND OF THE INVENTION

An application, such as a database server, may store information on persistent storage devices, such as hard disk drives, so that the application can retrieve and use such information in the future. Because of the physical reality of persistent storage devices, persistent storage devices may be called "physical devices." On a physical device, information is typically stored in discrete logical units called "blocks." For example, parts of a single file may be dispersed throughout multiple blocks on one or more physical devices. Each block stores a different part of the file. Each separate physical device may be viewed as a separate component within a storage layer.

Sometimes, an application indirectly interfaces with one or more physical devices through one or more intermediate storage layers that belong to a hierarchy of storage layers. Such a hierarchy of storage layers is also called an input/output (I/O) stack. For example, a database server application may interface directly with a file system. The file system may interface directly with a logical volume manager. The logical volume manager may interface directly with a storage subsystem that provides Redundant Array of Independent Disks (RAID), wherein each Disk is a separate physical device.

Through abstraction, each storage layer in the hierarchy may represent multiple different components of the storage layer as a single physical device. Such abstraction insulates upper storage layers from details that can be managed by lower storage layers. For example, a file may be divided into multiple parts, with each part being "stored" on a different logical volume. An application may instruct a file system to perform operations on the file without expressly indicating which logical volumes store the parts of the file. After receiving the file's identifier from the file system, a logical volume manager can determine which volumes store the parts of the file, and instruct a lower storage layer subsystem to perform corresponding operations on one or more of the relevant parts. Therefore, even though parts of a file may be dispersed throughout multiple logical volumes and multiple physical devices, the dispersion of the parts is transparent to the application that performs operations on the file.

It is useful to know on which physical devices the several blocks of a file are stored. In other words, it is useful to know a mapping between a file and the physical devices that collectively store the file. Such a mapping can be used, for example, to identify input/output bottlenecks. However, due to the multiple intermediate storage layers discussed above, determining such a mapping can be a difficult, if not impossible, task.

For example, a "first storage layer" file system may be a product of a first vendor, a "second storage layer" logical volume manager may be a product of a second vendor, and a "third storage layer" RAID manager may be a product of a third vendor. Each vendor may or may not provide a tool to determine mappings between components of that vendor's storage layer and file parts stored on those components. Where such tools exist, they are not currently designed to work in conjunction with each other. Currently, in storage systems that involve multiple intermediate storage layers, there is no way for an application that only directly interfaces with an uppermost storage layer to determine which physical devices store blocks of a particular file.

In a database, a database object such as a table may be stored within a single file, or divided among multiple files. While a database server application may possess sufficient information to determine a mapping of a database object to one or more files, database server applications are currently unable to determine a mapping of a file to one or more physical devices in storage systems that involve multiple intermediate storage layers. By extension, database server applications are currently unable to determine a mapping of a database object to one or more physical devices in such storage systems.

A technique for determining a mapping of a database object to storage layer components that collectively store the database object is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are described herein that allow a user or application to determine a mapping between a database object and components of a storage layer by querying one or more dynamically generated views that conveniently represent, for each storage layer in a storage system, which components of the storage layer actually or virtually store parts of the database object. Each view is defined by a query that extracts or derives data from tables that the view references. A database server automatically generates the views based on information that the database server automatically gathers from one or more vendor libraries, such as dynamic link libraries (DLLs).

Each vendor library includes one or more routines that implement a common Application Programming Interface (API). For the purpose of explanation, an embodiment shall be described in which each vendor library includes a "get-mapping routine", and in which the interface to invoke the get-mapping routine is the same for all vendor libraries, though each of those libraries may implement the get-mapping routine in a different way.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for determining a mapping of an object to storage layer components is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein that allow a user or application to determine a mapping between a database object and components of a storage layer by querying one or more dynamically generated views that conveniently represent, for each storage layer in a storage system, which components of the storage layer actually or virtually store parts of the database object. Each view is defined by a query that extracts or derives data from tables that the view references. A database server automatically generates the views based on information that the database server automatically gathers from one or more vendor libraries, such as dynamic link libraries (DLLs).

Each vendor library includes one or more routines that implement a common Application Programming Interface (API). For the purpose of explanation, an embodiment shall be described in which each vendor library includes a "get-mapping routine", and in which the interface to invoke the get-mapping routine is the same for all vendor libraries, though each of those libraries may implement the get-mapping routine in a different way.

Each storage layer is associated with a get-mapping routine from one of the vendor libraries. According to one embodiment, to determine a mapping between a file and one or more second storage layer components, the database server passes the file's identifier to the first storage layer's implementation of the get-mapping routine. The first storage layer's get-mapping routine responds to the invocation with one or more identities of components of the second storage layer that store one or more parts of the file. The file itself may be viewed as a component of the first storage layer.

The database server uses the information obtained from first storage layer's get-mapping routine to recursively obtain information from lower storage layers. For example, to determine a mapping between a second-layer component and one or more third storage layer components, the database server passes the second-layer component's identifier to the second storage layer's get-mapping routine. The second storage layer's get-mapping routine responds to the invocation with one or more identities of components of the third storage layer that store one or more parts of the second-layer component. For each second-layer component that stores a part of the file (i.e., the first-layer component), the database server passes the second-layer component's identifier to the second storage layer's get-mapping routine. As a result, the database server obtains, from the second storage layer's get-mapping routine, identities for each component in the third storage layer that stores a part of a second-layer component that stores a part of the file.

Through this recursive technique, the database server ultimately obtains the identity of each physical device that stores one or more blocks of a file. Thus, the database server obtains a mapping between a file and one or more physical devices. For each database object in a database, the database server can determine one or more files that store the database object. Therefore, for every database object in a database, the database server can obtain mappings between a database object and one or more physical devices, and automatically and dynamically generate views that capture such mappings. To determine selected ones of such mappings, a user or application can query the views instead of struggling with multiple different vendor tools. As a result, a user or application can obtain a complete definition of a storage hierarchy and the relationships between the components thereof.

Figure 1:
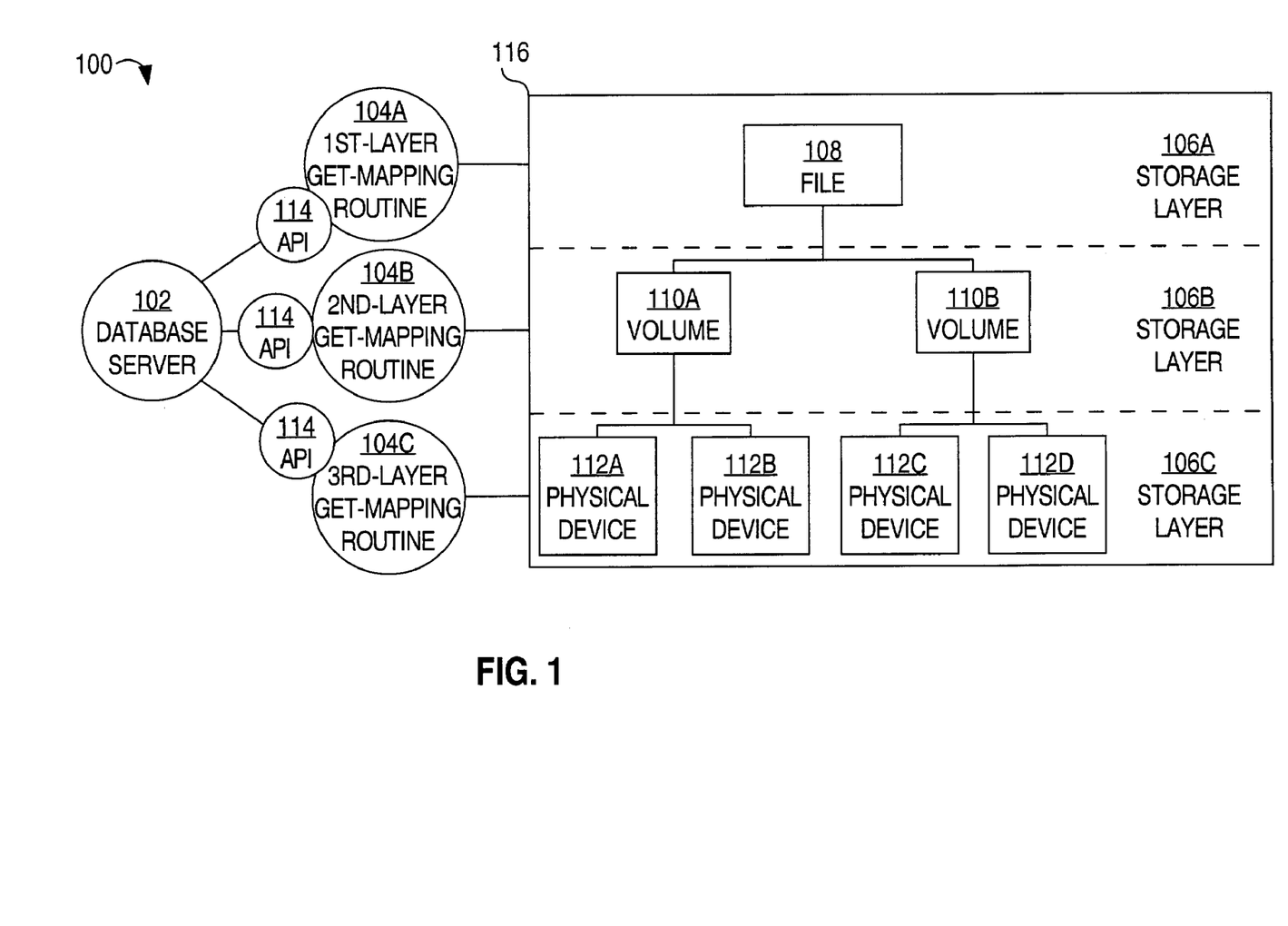
FIG. 1 is a block diagram that illustrates a system, according to an embodiment of the present invention, for determining a mapping of a database object to storage layer components.

FIG. 1 is a block diagram that illustrates a system 100, according to an embodiment of the present invention, for determining a mapping of a database object to storage layer components. System 100 comprises a database server 102, get-mapping routines 104A-104C, and a storage hierarchy 116. Storage hierarchy 116 comprises storage layers 106A-106C. For each of storage layers 106A-106C, there is an associated one of get-mapping routines 104A-104C. In the example shown, first-layer get-mapping routine 104A is associated with storage layer 106A, second-layer get-mapping routine 104B is associated with storage layer 106B, and third-layer get-mapping routine 104C is associated with storage layer 106C. In the example shown, there are three storage layers and three corresponding implementations of the get-mapping routine. However, other configurations of system 100 may comprise a greater or lesser number of storage layers.

Storage layer 106A comprises a file 108. Thus, file 108 is referred to as a component of storage layer 106A. A file system may manage the components of storage layer 106A. Storage layer 106B comprises volumes 110A and 110B. Thus, volumes 110A and 110B are referred to as components of storage layer 106B. A logical volume manager may manage the components of storage layer 106B. Storage layer 106C comprises physical devices 112A-112D. Thus, physical devices 112A-112D are referred to as components of storage layer 106C. For example, the components of storage layer 106C may be independent physical devices in a RAID configuration. A RAID manager may manage the components of storage layer 106C.

Through abstraction, storage layers 106B and 106C may represent multiple ones of their respective components as a single physical device to the storage layer immediately above. In the example illustrated, storage layer 106C represents that separate physical devices 112A and 112B are a single physical device that comprises volume 110A. Consequently, the separateness of physical devices 112A and 112B is not apparent to entities that see only volume 110A. Similarly, storage layer 106C represents that separate physical devices 112C and 112D are a single physical device that comprises volume 110B. Consequently, the separateness of physical devices 112C and 112D is not apparent to entities that see only volume 110B. Likewise, storage layer 106B represents that separate volumes 110A and 110B are a single physical device that comprises file 108. Consequently, the separateness of volumes 110A and 110B is not apparent to entities that see only file 108.

The following example illustrates how parts of a single file may be distributed throughout multiple components of multiple storage layers of a storage hierarchy. A single file 108 may be divided into four subparts, each subpart comprising one or more blocks. A first subpart may be stored on physical device 112A. A second subpart may be stored on physical device 112B. A third subpart may be stored on physical device 112C. A fourth subpart may be stored on physical device 112D. Through a RAID manager associated with storage layer 106C, storage layer 106C represents physical devices 112A and 112B as a single physical device that comprises volume 110A. Also through the RAID manager, storage layer 106C represents physical devices 112C and 112D as a single physical device that comprises volume 110B. Thus, volume 110A virtually stores a first file part comprising the first and second subparts, and volume 110B virtually stores a second file part comprising the third and fourth subparts. Through a logical volume manager associated with storage layer 106B, storage layer 106B represents volumes 110A and 110B as a single physical device that comprises file 108.

According to one embodiment, each of get-mapping routines 104A-104C resides in a different vendor library. However, through API 114, each of get-mapping routines 104A-104C exposes the same common interface to database server 102. Thus, database server 102 interacts with each of get-mapping routines 104A-104C by making calls through the same common interface provided by API 114. While each of get-mapping routines 104A-104C may implement the API 114 in different ways, the names and the parameters accepted as input by the get-mapping routines are the same regardless of implementation.

For example, API 114 may define a routine with the name "get-mapping" that accepts a single parameter as input. The get-mapping routine 104B may be designed to determine which ones of volumes 110A and 110B store one or more parts of a file identified by the parameter. In contrast, the get-mapping routine 104C, while having the same name and input parameters as get-mapping routine 104B, may be designed to determine which ones of physical devices 112A-112D store one or more parts of a volume identified by the parameter.

According to one embodiment, while each implementation of the get-mapping routine may operate relative to different ones of storage layers 106A-106C in storage hierarchy 116, the function and results of the implementations of the method are similar. For example, regardless of the specific implementation, the get-mapping routine identifies one or more lower storage layer components that store divisions of a higher storage layer component identified by a parameter passed to the method. The component identified by the parameter may be a file, a volume, etc.

In various embodiments described hereafter, each get-mapping routine implementation is associated with a separate storage layer. However, in alternative embodiments, more than one storage layer may be associated with the same get-mapping routine implementation. The present invention is not limited to a one-to-one correlation between get-mapping implementations and storage system layers.

Because the interface exposed by each of get-mapping routines 104A-104C is common, database server 102 can interface with each of get-mapping routines 104A-104C in the same manner, without needing to determine which routine is associated with a particular storage layer. The definition of API 114 may be distributed to each vendor that produces a storage layer manager (e.g., a logical volume manager or RAID manager), so that each vendor can incorporate one or more routines that implements API 114 into the vendor library that corresponds to the storage layer.

Determining which Components Store a Table

According to one embodiment, to determine which components of a storage layer store parts of a database object, such as a table, database server 102 determines the identities of one or more files that collectively contain all of the parts of the database object. Parts of a database object may be contained in more than one file. Database server 102 may make such a determination based on information that database 102 stores.

For each file in which a database object part is contained, database server 102 does the following. Database server 102 invokes a get-mapping routine that is implemented by each of get-mapping routines 104A-104C. In invoking each get-mapping routine, database server 102 passes a filename of the file to each routine implementation. For example, one such file may be file 108.

At least one of get-mapping routines 104A-104C is associated with a storage layer that recognizes the filename. The get-mapping routine that is associated with a storage layer that recognizes the filename returns one or more volume identifiers. For example, in response to the invocation of the get-mapping routine, get-mapping routine 104A may determine that volume 110A stores a first part of the file identified by the filename, and that volume 110B stores a second part of file identified by the filename. Get-mapping routine 104A determines one or more volume identifiers, each of which stores a part of the file, and returns the one or more volume identifiers to database server 102. Thus, for each file, mappings between the file and one or more volumes are determined.

For each volume identifier, database server 102 does the following. Database server 102 invokes each of get-mapping routines 104A-104C. This time, in invoking each get-mapping routine, database server 102 passes the volume identifier to each get-mapping routine.

At least one of get-mapping routines 104A-104C is associated with a storage layer that recognizes the volume identifier. The get-mapping routine that is associated with the storage layer that recognizes the volume identifier returns one or more physical device identifiers. For example, in response to the invocation of the get-mapping routines, get-mapping routine 104B may determine that physical device 112A stores a first part of the volume identified by the volume identifier, and that physical device 112B stores a second part of the volume identified by the volume identifier. Get-mapping routine 104B determines one or more physical device identifiers, each of which stores a stores a part of a volume that stores a part of the file, and returns the one or more physical device identifiers to database server 102 as a result of the method. Thus, for each volume, mappings between the volume and one or more physical devices are determined.

By doing the above for each database object in a database, database 102 determines mappings between the database object and storage layer components that store parts of the database object at each level of granularity. Using these mappings, database 102 may dynamically generate views that a user or application can query to discover information about where any part of any database object or storage layer component is stored within any storage layer. In addition to the mappings described above, get-mapping routines 104A-104C may return, to database 102, additional information that database 102 may use in generating the views. Examples of such additional information are provided below. Through the views, a complete picture of the relationships between components of each storage layer can be obtained. Using information obtained from the views, database I/O performance can be evaluated, and relationships between storage layer components can be adjusted to improve database I/O performance.

Figure 2:
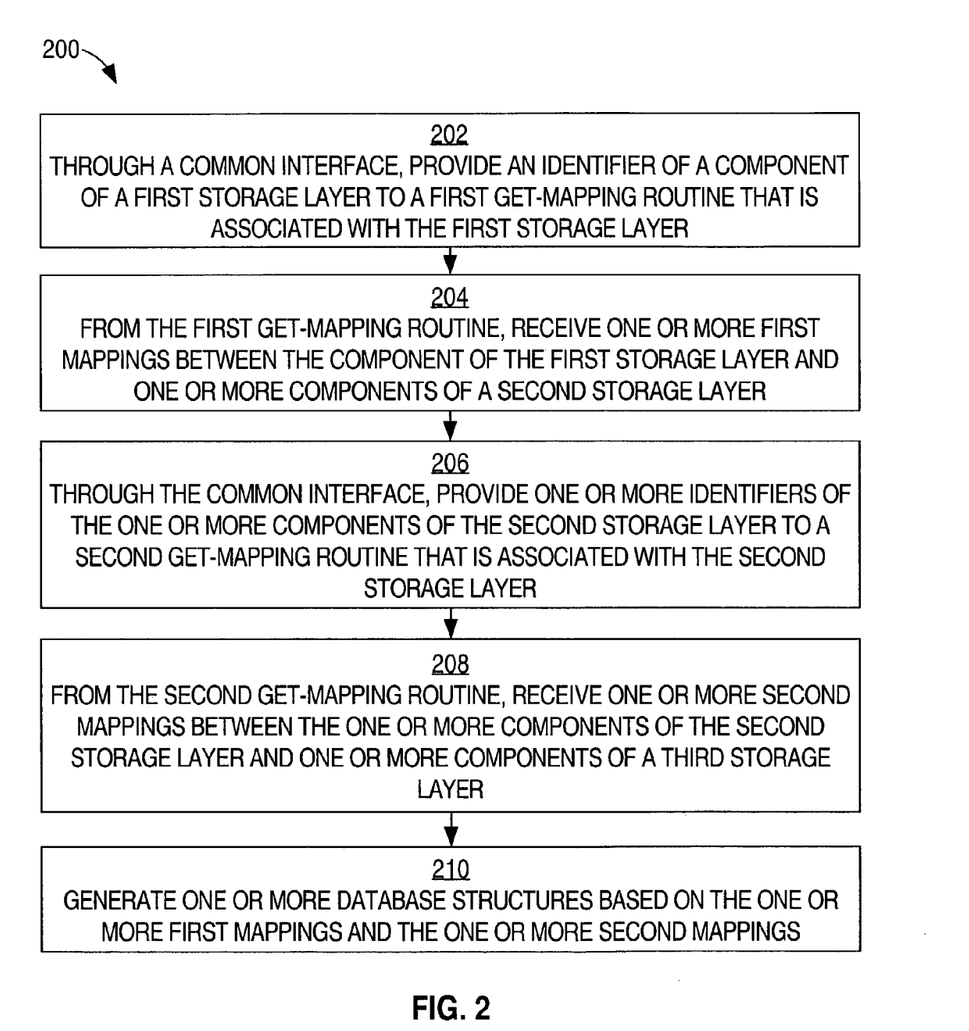
FIG. 2 is a flow diagram that illustrates a technique, according to an embodiment of the present invention, for determining a mapping of a storage layer component to underlying storage layer components.

Determining a Mapping of a Storage Layer Component to Underlying Storage Layer Components FIG. 2 is a flow diagram that illustrates a technique 200, according to an embodiment of the present invention, for determining a mapping of a storage layer component to underlying storage layer components. Technique 200 may be performed, for example, by database server 102.

In block 202, an identifier of a component of a first storage layer is provided, through a common interface, to a first get-mapping routine that is associated with a first storage layer. For example, database server 102 may provide an identifier of file 108 to get-mapping routine 104A.

In embodiments where the database server does not know the correlation between the get-mapping routines 104A-104C and the layers of the storage hierarchy, the database server may invoke all of get-mapping routines 104A-104C during each iteration. Under these circumstances, only the get-mapping routine that recognizes the identifier returns positive results to the database server. As shall be described hereafter, those positive results are then used during the next iteration to get mapping information from the next lower layer in the storage hierarchy.

In block 204, one or more first mappings, between the components of the first storage layer and one or more components of the second storage layer, are received from the first get-mapping routine. The first mappings contain identifiers of each of the one or more components of the second storage layer. Continuing the example, database server 102 may receive, from get-mapping routine 104A, a mapping between file 108 and volume 110A, and a mapping between file 108 and volume 110B. Not recognizing the file identifier, get-mapping routines 104B and 104C return nothing to database server 102.

Recursively, in block 206, one or more identifiers, corresponding respectively to each of the one or more components of the second storage layer, are provided, through the common interface, to a second get-mapping routine that is associated with a second storage layer. Continuing the example, database server 102 may call get-mapping routine 104B to provide an identifier of volume 110A to get-mapping routine 104B. Similarly, database server 102 also may call get-mapping routine 104B to provide an identifier of volume 110B to get-mapping routine 104B.

As mentioned above, if database server 102 does not know which get-mapping routine is associated with a particular storage layer, then database server 102 also may make calls to get-mapping routines 104A and 104C. However, get-mapping routines 104A and 104C would not recognize the volume identifiers. Therefore, those routines would not return any positive results.

In block 208, one or more second mappings, between the one or more components of the second storage layer and one or more components of the third storage layer, are received from the second get-mapping routine. The second mappings contain identifiers of each of the one or more components of the third storage layer. Continuing the example, database server 102 may receive, from get-mapping routine 104B, as results of two separate invocations of the get-mapping routine 104B (one for each volume), a mapping between volume 110A and physical device 112A, a mapping between volume 110A and physical device 112B, a mapping between volume 110B and physical device 112C, and a mapping between volume 110B and physical device 112D. Not recognizing the volume identifiers, get-mapping routines 104A and 104C return nothing to database server 102.

The technique described above with reference to blocks 202-208 is not limited to two storage layers. The technique described above may be recursively applied to any number of storage layers. For each particular storage layer, identifiers of components of the particular storage layer may be provided to the get-mapping routine of the particular storage layer. In response to the provision of the identifiers, the get-mapping routine returns mappings between the components of the particular storage layer and one or more immediately-underlying-storage-layer components that store parts of the identified components of the particular storage layer.

When a get-mapping routine associated with a lowest storage layer is called, the get-mapping routine may return an indication that the components identified to the get-mapping routine are physical devices. A database server can determine from such an indication that the database server does not need to make any calls to get mappings for any lower storage layers. This is the case with storage layer 106C.

Mapping Information

Along with a mapping between a particular storage layer component and one or more underlying storage layer components that store parts of the particular storage layer component, a get-mapping routine may return a component offset. The component offset indicates a beginning address in the underlying storage layer component where a part of the particular storage layer component is stored. A get-mapping routine also may return a size of the part. Additionally, a get-mapping routine may return an identity of the underlying storage layer in which the underlying storage component is contained.

In block 210, one or more database structures are generated based on the one or more first mappings and the one or more second mappings. Continuing the example, database 102 may generate database views, such as Oracle V$ tables, based on the mappings received from get-mapping routines 104A and 104B. The database views may be generated based on additional mappings received from additional get-mapping routines that are associated with additional storage layers. The database views may contain additional information derived from the information returned by the get-mapping routines.

By querying the database views, a user or application can determine, for any database object in the database, at any storage layer in the storage hierarchy, the identities of the components that store the parts. By querying the database views, a user or application can determine, for any block of a database object and any storage layer in the storage hierarchy, where the block is located in the storage layer. Together, the database views represent a complete "picture" of the storage hierarchy, from database objects to blocks.

Determining a Type of Relationship between Storage Layer Components

Parts of a component of a particular storage layer may be stored by one or more components of a storage layer immediately underlying the particular storage layer. The component of the particular storage layer may be referred to as a "parent" component of the underlying storage layer components that store the parts of the component of the particular storage layer. Inversely, the underlying storage layer components that store the parts of the component of the particular storage layer may be referred to as "child" components of the component of the particular storage layer.

For example, physical device 112A may store a first part of volume 110A, and physical device 112B may storage a second part of volume 110A. In this case, components 112A and 112B can be referred to as child components of component 110A, and component 110A can be referred to as a parent component of components 112A and 112B. Similarly, components 112C and 112D may be called child components of component 110B, and component 110B can be called a parent component of components 112C and 112D.

The relationship between a parent component and one or more child components of the parent component may be any one of several different types of relationships. The type of relationship indicates how multiple child components are represented, or abstracted, as a single physical device to a parent component.

For example, a concatenation of components 112A and 112B may comprise volume 110A. In that case, component 112A contains a first sequential part of the data stored on volume 110A, and component 112B contains a last sequential part of the data stored on volume 110A.

For another example, component 110B may be a mirror of components 112C and 112D. In that case, components 112C and 112D store the same data. Mirroring is used, for example, when physical devices are in a RAID-1 configuration.

For another example, child components may be related to a parent component in a striping type of relationship. In that case, data is interleaved between the child components in equally sized sets of contiguous blocks called stripes. Striping is used, for example, when physical devices are in a RAID-0 configuration.

Once known, the type of relationship between a parent component and child components can be used in determining where parts of a database object, file, or other storage layer component are located. For example, if volume 110B is in a mirror type of relationship with physical devices 112C and 112D, and if volume 110B stores a part that is 50 kilobytes in size, then it may be determined that physical device 112C stores 50 kilobytes of the part, and physical device 112D also stores 50 kilobytes of the part.

Figure 3:
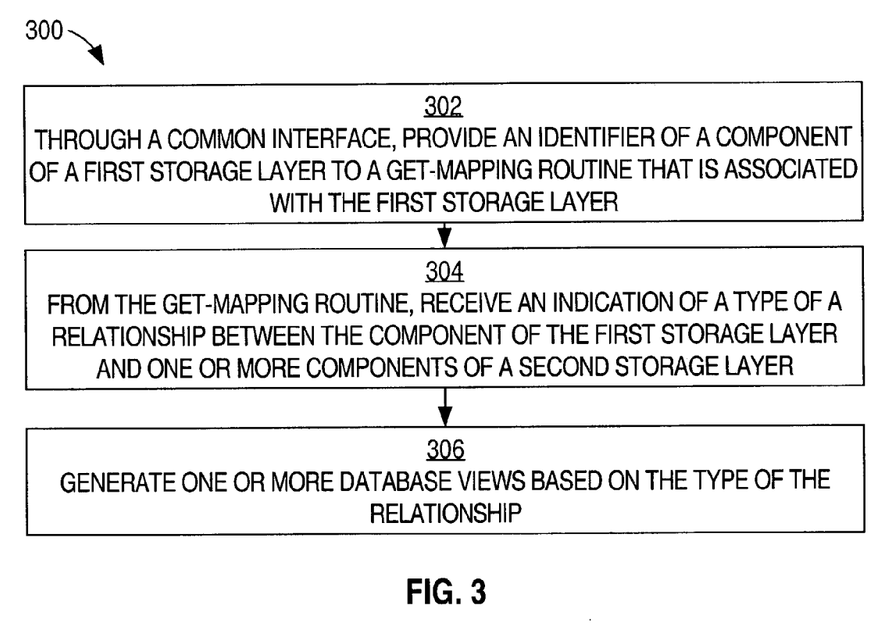
FIG. 3 is a flow diagram that illustrates a technique, according to an embodiment of the present invention, for determining a type of relationship between storage layer components.

FIG. 3 is a flow diagram that illustrates a technique 300, according to an embodiment of the present invention, for determining a type of relationship between storage layer components. Technique 300 may be performed, for example, by database server 102.

In block 302, an identifier of a component of a first storage layer is provided, through a common interface, to a get-mapping routine that is associated with the first storage layer.

For example, database server 102 may provide an identifier of volume 110B to get-mapping routine 104B.

In block 304, a type of relationship between the component of the first storage layer and one or more components of the second storage layer is received from the get-mapping routine. Continuing the example, database 102 may receive, from get-mapping routine 104B, an indication that volume 110B is in a mirror type relationship with physical devices 112C and 112D. Some examples of types of relationships are mirror, concatenation, and striped configuration.

Along with the indication of the type of relationship between the component of the first storage layer and the one or more components of the second storage layer, identifiers of the one or more components of the second storage layer are received from the get-mapping routine that is associated with the second storage layer. The technique described above with reference to blocks 302-304 may be recursively applied to the identifiers of the one or more components of the second storage layer. For each particular storage layer, an identifier of a component of the particular storage layer may be provided to a particular get-mapping routine that is associated the particular storage layer. In response to the provision of the identifier, the particular get-mapping routine returns an indication of a type of relationship between the component of the particular storage layer and child components of the particular component, along with the identities of the child components.

In block 306, one or more database views are generated based on the type of relationship. Continuing the example, database 102 may generate database views, such as Oracle V$ tables, based on the type of relationship indicated by get-mapping routine 104B. For example, a view may indicate that volume 110B is in a mirror type relationship with physical devices 112C and 112D.

A user or application can query the one or more database views to obtain a complete concept of the components in each storage layer, and the types of relationships between components of different storage layers. For example, an application such as Oracle Enterprise Manager could generate a graphical representation of an entire storage hierarchy based on information queried from the database views. The storage hierarchy could be represented graphically as a tree of storage layer components.

Example Database View

Table 1 illustrates an example of selected columns and rows of a database view that shows where the parts of a database object are located in a storage hierarchy. Such a view may be derived, for example, by database server 102 using information that database 102 gathered by performing techniques 200 and 300, described above. The view illustrated in Table 1 may contain information selected from one or more other views.

TABLE 1

Selections From An Example Database View

| OBJECT NAME | OBJECT OFFSET | OBJECT SIZE | COMPONENT OFFSET | COMPONENT IDENTIFIER | STORAGE LAYER |
|---|---|---|---|---|---|
| EMP | 0 | 100 | 0 | 108 | 106A |
| EMP | 0 | 50 | 0 | 110A | 106B |
| EMP | 50 | 50 | 10 | 110B | 106B |
| EMP | 0 | 25 | 0 | 112A | 106C |
| EMP | 50 | 50 | 0 | 112C | 106C |

The rows of Table 1 are generated for an example database object "EMP" that file 108 stores. In this example, the database object is 100 kilobytes (K) in size. The first column, "OBJECT NAME," indicates that the name of the database object to which each row's data pertains. In this example, each row's data pertains to database object "EMP". Each row contains data concerning a part of the database object at some level of granularity.

In this example, 50K of the 100K are stored virtually on volume 110A, and 50K of the 100K are stored virtually on volume 110B, as indicated by the "OBJECT SIZE" and "COMPONENT IDENTIFIER" fields of the second and third rows. The "OBJECT OFFSET" of 0 in the second row indicates that the 50K stored on volume 110A are the 50K starting at offset 0 of the database object. In other words, the 50K stored on volume 110A are the first 50K of database object "EMP". The "COMPONENT OFFSET" of 0 in the first row indicates that the 50K stored on volume 110A begin at offset 0 of volume 110A.

The "OBJECT OFFSET" of 50 in the third row indicates that the 50K stored on volume 110B are the 50K starting at offset 50 of the database object. In other words, the 50K stored on volume 110B are the last 50K of database object "EMP". The "COMPONENT OFFSET" of 10 in the third row indicates that the 50K stored on volume 110B begin at offset 10 of volume 110B. The second and third rows additionally indicate that volumes 110A and 110B are components of "STORAGE LAYER" 106B.

In this example, volume 110A comprises a concatenation of physical devices 112A and 112B. The fourth row indicates that 25K of the 50K stored on volume 110A are stored on physical device 112A, and that physical device 112A is a component of storage layer 106C. The fourth row indicates that the 25K stored on physical device 112A are the 25K starting at offset 0 of the database object. Based on the second row indicating that 50K of the database object stored on volume 110A are the 50K beginning at offset 0 of the database object, and the fourth row indicating that 25K of the database object stored on physical device 112A are the 25K beginning at offset 0 of the database object, it can be deduced that the 25K stored on physical device 112A are part of the 50K stored on volume 110A. Offsets within the database object are consistent throughout the storage layers.

In this example, volume 110B is a mirror of physical devices 112C and 112D. The fifth row indicates that 50K of the 50K stored on volume 110B are stored on physical device 112C, and that physical device 112C is a component of storage layer 106C. The fifth row indicates that the 50K stored on physical device 112C are the 50K starting at offset 50 of the database object. Based on the third row indicating that 50K of the database object stored on volume 110B are the 50K beginning at offset 50 of the database object, and the fifth row indicating that 50K of the database object stored on physical device 112C are the 50K beginning at offset 50 of the database object, it can be deduced that the 50K stored on physical device 112C are the 50K stored on volume 110B.

Information in a view may be derived mathematically from other information obtained through techniques described herein. For example, database server 102 may determine, through techniques described herein, that 50K of a file are stored on volume 110A at offset 0K, that 25K of volume 110A are stored on physical device 112A at offset 0K of the device, and that the remaining 1000K of volume 110A are stored on physical device 112B at offset 50K of the device. From this information, database server 102 may derive mathematically that 25K of the file are stored at offset 0K of physical device 112A, and the remaining 25K of the file are stored at offset 50K of physical device 112B. Database server 102 may use such derived information in generating a view.

As a database server generates a view, the database server may detect patterns in the data and consolidate rows of the view based on the detected patterns. In this way, information that would otherwise be represented in many rows of a view may be represented in fewer rows of the view.

By combining information about which storage layer components store parts of files, and which files store parts of database objects, such as tables, a database server may generate one or more views that illustrate which storage layers components store parts of database objects. The database server will already have access to information about which files store parts of database objects.

Managing Mapping Information

According to one embodiment, routines are provided for managing mapping information that belongs to views. Such routines may be provided, for example, as part of a Procedural Language/Structured Query Language (PL/SQL) package. Using such routines, data represented in views may be modified. For example, a user or application may modify one or more mappings, as represented in the views, so that a particular object is represented as being stored by different storage layer components, or so that a particular parent component is represented as being related to different child components. By modifying data represented in the views, a modified storage hierarchy may be constructed. The modified storage hierarchy can represent objects as being stored at locations other than the actual locations at which those objects are stored.

The PL/SQL package may define several different procedures that may be called to cause a database server to determine different mappings. For example, a procedure called "map all" may cause the database server to determine mappings, between files and storage layer components, for all files that comprise a database. For another example, a procedure called "map file" may cause the database server to determine mappings between a specified file and storage layer components that store parts of the specified file. A procedure called "map component" may cause the database server to determine mappings between a specified component, such as a volume, and the objects stored by the specified component. A procedure called "map object" may cause the database server to determine mappings between a specified database object, such as a table, and storage layer components that store the specified database object.

A procedure called "save" may cause data in one or more views to be saved in the database's data dictionary on a persistent storage device. For example, a view that contains mappings between parent components and child components, and the types of relationships between the components, may be saved in the database's data dictionary. A procedure called "restore" may cause such data that is stored in the data dictionary to be loaded into the database server's memory as a view. In this manner, dynamically generated mappings can be saved and restored so that the mappings do not need to be re-generated every time that a database server is shut down and restarted. By saving modified mappings, a modified storage hierarchy can be saved for later retrieval and use.

The organization of a database may change after mappings are saved to the data dictionary. According to one embodiment, when mappings are restored from the data dictionary, a database server may quickly verify that the mappings are still correct, and modify the mappings to reflect the current database organization if the mappings are not current.

Using the Mapping Information to Improve Performance

As a database server performs operations on data in a database, the database server may store information that identifies each operation. The database server may also store statistics on the performance of each operation. According to one embodiment, such operations may be simulated relative to a storage hierarchy that has been modified from an original storage hierarchy on which such operations were originally performed. New performance statistics may be generated based on the operations simulated relative to the modified storage hierarchy. Through such simulation, a user or application can determine whether an actual modification to the database would increase performance. For example, a user or application may determine whether the current configuration of the storage hierarchy creates an I/O bottleneck due to one or more components being accessed disproportionately to other components. Database performance information generated through such simulation may indicate that objects currently consolidated on the disproportionately accessed components ought to be distributed among other components to balance I/O operations.

Hardware Overview

Figure 4:
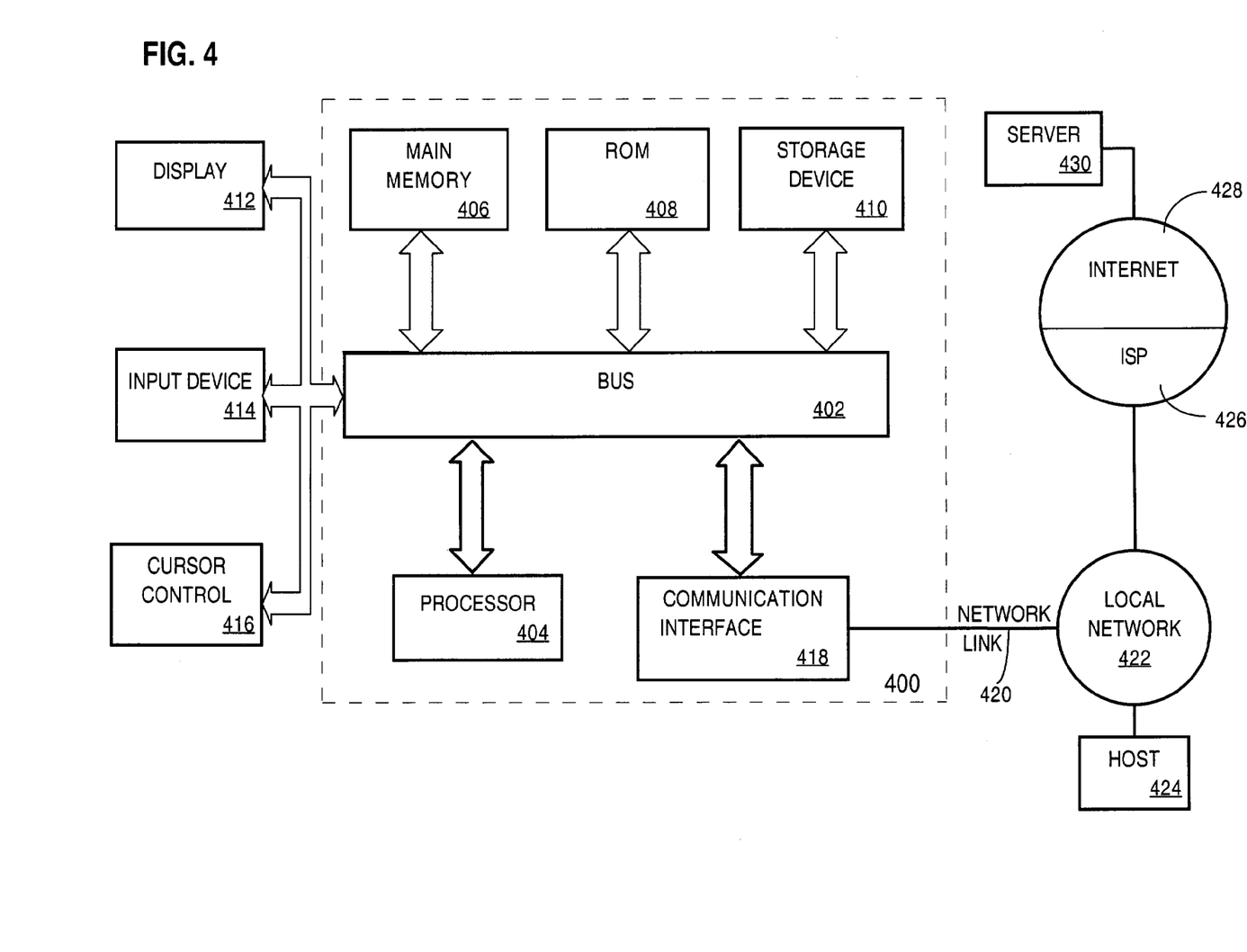
FIG. 4 is a block diagram that illustrates a computer system 400 upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of determining a mapping of an object to storage layers, the method comprising:

providing an identifier of a component of a first storage layer of a physical data storage system, through a particular routine interface, to a first get-mapping routine that is associated with said first storage layer and that is executed by a processor;

receiving, from said first get-mapping routine, one or more first mappings between said component of said first storage layer and one or more components of a second storage layer;

providing one or more identifiers of said one or more components of said second storage layer, through said particular routine interface, to a second get-mapping routine that is associated with said second storage layer; and receiving, from said second get-mapping routine, one or more second mappings between said one or more components of said second storage layer and one or more components of a third storage layer;

wherein the first get-mapping routine and the second get-mapping routine have different implementations for the same routine interface;

generating one or more database views based on said one or more first mappings and said one or more second mappings;

wherein at least one database view of said one or more database views comprises information from said first storage layer, said second storage layer, and said third storage layer;

storing, on a volatile or non-volatile computer-readable storage medium, performance statistics on operations performed on data in a database;

simulating said operations relative to a modified storage hierarchy that has been modified from an original storage hierarchy on which said operations were originally performed;

generating new performance statistics based on operations simulated relative to the modified storage hierarchy; and determining database performance information based at least in part on said one or more database views and said new performance statistics; and presenting said database performance information via a display device.

2. The method of claim 1, further comprising:

determining, based on said new performance statistics, whether an input/output bottleneck results from said one or more first mappings or said one or more second mappings.

3. The method of claim 1, wherein said one or more first mappings indicate one or more offsets of one or more parts of said component of said first storage layer within said one or more components of said second storage layer, and further comprising:

representing said one or more offsets within a database view that contains information that indicates said one or more offsets as numerical offsets that represent, as numbers, how far away from initial addresses of storage devices said one or more parts begin.

4. The method of claim 1, wherein two or more of said components of said second storage layer are represented as a single physical device to said component of said first storage layer.

5. The method of claim 1, further comprising:

providing said identifier of said component of said first storage layer, through said particular routine interface, to one or more get-mapping routines other than said first get-mapping routine;

wherein each of said one or more get-mapping routines other than said first get-mapping routine is associated with a different storage layer in a plurality of storage layers.

6. The method of claim 1, further comprising:

during each iteration of a plurality of iterations, performing the steps of:

providing, through said particular routine interface, to each get-mapping routine of a plurality of get-mapping routines, one or more identifiers that were received from a particular get-mapping routine that is associated with a particular storage layer that recognized an identifier that was provided to said particular get-mapping routine during a previous iteration of said plurality of iterations; and receiving, from one of said plurality of get-mapping routines, one or more identifiers to be provided to each get-mapping routine of said plurality of get-mapping routines during a next iteration of said plurality of iterations;

wherein each get-mapping routine of said plurality of get-mapping routines is associated with a different storage layer.

7. The method of claim 1, wherein a complete set of input parameters accepted by the first get-mapping routine is the same as a complete set of input parameters accepted by the second get-mapping routine.

8. The method of claim 1, further comprising:

generating one or more database structures based on said one or more first mappings and said one or more second mappings.

9. The method of claim 1, further comprising:

storing said first mappings and said second mappings on a persistent storage medium; and retrieving said first mappings and said second mappings into random access memory (RAM) from said persistent storage medium.

10. The method of claim 1, wherein said component of said first storage layer is a file.

11. The method of claim 1, wherein said one or more components of said second storage layer are one or more logical volumes.

12. The method of claim 1, wherein said one or more components of said third storage layer are one or more persistent storage devices in a redundant away of independent disks (RAID).

13. The method of claim 1, wherein two or more of said components of said second storage layer are represented as a single physical device to said component of said first storage layer.

14. The method of claim 1, further comprising:
providing said identifier of said component of said first storage layer, through said interface, to one or more get-mapping routines other than said first get-mapping routine;
wherein each of said one or more get-mapping routines other than said first get-mapping routine is associated with a different storage layer in a plurality of storage layers.

15. The method of claim 1, further comprising:
during each iteration of a plurality of iterations, performing the steps of:
providing, through an interface, to each get-mapping routine of a plurality of get-mapping routines, one or more identifiers that were received from a particular get-mapping routine that is associated with a particular storage layer that recognized an identifier that was provided to said particular get-mapping routine during a previous iteration of said plurality of iterations; and
receiving, from one of said plurality of get-mapping routines, one or more identifiers to be provided to each get-mapping routine of said plurality of get-mapping routines during a next iteration of said plurality of iterations;
wherein each get-mapping routine of said plurality of get-mapping routines is associated with a different storage layer.

16. A computer-readable storage medium carrying one or more sequences of instructions which, when executed by one or more processors, causes the one or more processors to perform the method recited in claim 1.

17. A computer-readable storage medium carrying one or more sequences of instructions which, when executed by one or more processors, causes the one or more processors to perform the method recited in claim 2.

18. A computer-readable storage medium carrying one or more sequences of instructions which, when executed by one or more processors, causes the one or more processors to perform the method recited in claim 3.

19. A computer-readable storage medium carrying one or more sequences of instructions which, when executed by one or more processors, causes the one or more processors to perform the method recited in claim 4.

20. A computer-readable storage medium carrying one or more sequences of instructions which, when executed by one or more processors, causes the one or more processors to perform the method recited in claim 5.

21. A computer-readable storage medium carrying one or more sequences of instructions which, when executed by one or more processors, causes the one or more processors to perform the method recited in claim 6.

22. A computer-readable storage medium carrying one or more sequences of instructions which, when executed by one or more processors, causes the one or more processors to perform the method recited in claim 7.

23. A computer-readable storage medium carrying one or more sequences of instructions which, when executed by one or more processors, causes the one or more processors to perform the method recited in claim 8.

24. A computer-readable storage medium carrying one or more sequences of instructions which, when executed by one or more processors, causes the one or more processors to perform the method recited in claim 9.

25. A computer-readable storage medium carrying one or more sequences of instructions which, when executed by one or more processors, causes the one or more processors to perform the method recited in claim 10.

26. A computer-readable storage medium carrying one or more sequences of instructions which, when executed by one or more processors, causes the one or more processors to perform the method recited in claim 11.

27. A computer-readable storage medium carrying one or more sequences of instructions which, when executed by one or more processors, causes the one or more processors to perform the method recited in claim 12.

28. A computer-readable storage medium carrying one or more sequences of instructions which, when executed by one or more processors, causes the one or more processors to perform the method recited in claim 13.

29. A computer-readable storage medium carrying one or more sequences of instructions which, when executed by one or more processors, causes the one or more processors to perform the method recited in claim 14.

30. A computer-readable storage medium carrying one or more sequences of instructions which, when executed by one or more processors, causes the one or more processors to perform the method recited in claim 15.

* * * * *

UNITED STATES PATENT AND TRADEMARK OFFICE
CERTIFICATE OF CORRECTION

| | |
|---|---|
| PATENT NO. | : 7,577,675 B2 |
| APPLICATION NO. | : 10/427321 |
| DATED | : August 18, 2009 |
| INVENTOR(S) | : Waleed Ojeil et al. |

It is certified that error appears in the above-identified patent and that said Letters Patent is hereby corrected as shown below:

In column 17, line 11, in claim 12, delete "away" and insert -- array --, therefor.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,577,675 B2 Page 1 of 1
APPLICATION NO. : 10/427321
DATED : August 18, 2009
INVENTOR(S) : Ojeil et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 688 days.

Signed and Sealed this

Seventh Day of September, 2010

David J. Kappos
*Director of the United States Patent and Trademark Office*